June 7, 1938.   E. E. WINKLEY   2,119,617
CONTROL MECHANISM
Filed Nov. 11, 1935

INVENTOR
Erastus E. Winkley
By his attorney
Victor Cobb.

Patented June 7, 1938

2,119,617

UNITED STATES PATENT OFFICE 2,119,617

CONTROL MECHANISM

Erastus E. Winkley, Lynn, Mass., assignor to United Shoe Machinery Corporation, Paterson, N. J., a corporation of New Jersey Application November 11, 1935, Serial No. 49,268

6 Claims. (Cl. 192—125)

This invention relates to mechanism for controlling the operation of machines, for example for preventing under certain circumstances the operation of individual machines of a series which are used to perform successive operations upon an article being manufactured.

In the manufacture of shoes by the so-called rink system, a plurality of machines are arranged in series in the order of operations which are to be performed. An operator of a preceding machine, for example operator number 1, as fast as he completes his operation on a shoe, places the shoe upon a support which is accessible to operator number 2 of the succeeding machine. Operator number 2 takes the shoes one by one from this support, operates upon them and places them upon a second support which is accessible to operator number 3, etc. The shoes thus pass through the various operations in sequence; and if, as is common, they comprise groups or lots of shoes of different styles, the lots of each style remain together as they pass through the series of machines as long as the system is running smoothly. If, however, for any reason, the operator of a preceding machine turns out partly finished shoes faster than the next succeeding operator can take care of them—a situation which arises for example when the succeeding machine breaks down—the preceding operator soon fills the support provided for the shoes upon which he has operated and thereafter piles the shoes indiscriminately wherever he can, usually upon the floor. When such an abnormal accumulation of shoes of various styles occurs, the shoes become mixed with one another so that, after the machine which broke down has been put into operation again, considerable time is required to sort out the various styles of shoes which have accumulated and put them in proper order once more.

In order to take care of situations of which the one outlined above is an example and in accordance with one feature of the invention, a machine is prevented from further operation when more than a given number of articles operated upon by it and placed by the operator upon a support have accumulated on the support. In the illustrated construction, the operator of a preceding machine places the articles upon a support from which they are taken by the operator of a succeeding machine preparatory to performing the succeeding operation, said support being yieldingly held in a predetermined position as long as the articles placed upon it do not exceed a certain weight. When, however, this weight is exceeded the support is moved down, and this movement of the support, through suitable mechanism, prevents further operation of the preceding machine.

In order to ensure that the attention of the foreman shall be immediately called to the fact that the operation of a machine has been stopped, there is provided, in accordance with another feature of the invention, a signal which is automatically displayed when more than the predetermined number of articles have accumulated on the support.

These and other features of the invention, including certain details of construction and combinations of parts, will be described as embodied in an illustrated construction and pointed out in the appended claims.

Referring now to the accompanying drawing.

Figure 1:
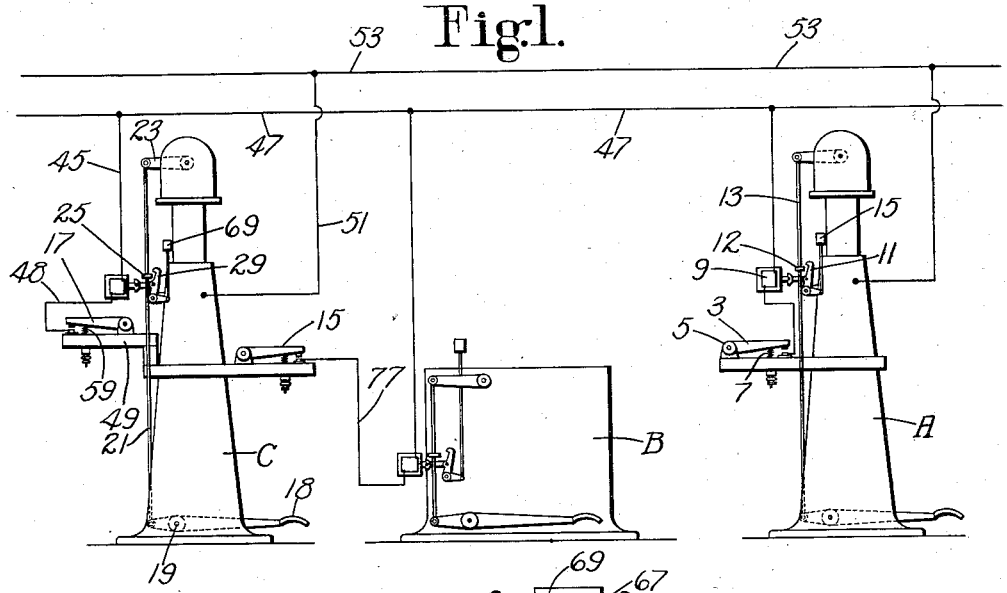
Fig. 1 is a diagrammatic elevation of a control mechanism applied to a series of three machines which are adapted to perform operations successively upon articles being manufactured.

The work passes through the series of machines from right to left as viewed in Fig. 1, the three machines shown being indicated respectively at A, B and C. As fast as the operator of machine A finishes his operation upon an article, he places it upon a support in the form of a table 3 pivoted at 5 to a stationary part of the machine and held up by a spring 7, said spring being of such strength and tension that, until a number of articles which exceed a certain weight have been placed upon the support, said support will remain in the position shown; but as soon as this weight is exceeded, the support will swing down about its pivot and close an electric circuit. Closing the circuit energizes a solenoid 9 which pulls a controller, in the form of a catch 11, over a collar 12 on a treadle rod 13 thereby preventing upward movement of said treadle rod and thus preventing further operation of the machine, it being understood that the treadle is normally held in the position shown by the usual spring and is depressed and released once for each operation of the machine. At the same time that the controller 11 becomes operative, a signal 15 is displayed.

The operator of machine B takes the articles one by one from the support 3, operates upon them and places them upon a support 15 which is substantially the same as the support 3 and acts to prevent further operation of machine B whenever a number of articles which exceed a predetermined weight accumulate upon it. The operator of machine C takes the articles from the support 15, operates upon them and places them upon a support 17 which is substantially identical with the supports 15 and 3 and operates in the same manner. The operator of the machine (not shown) which follows machine C takes the articles from the support 17.

Figure 2:
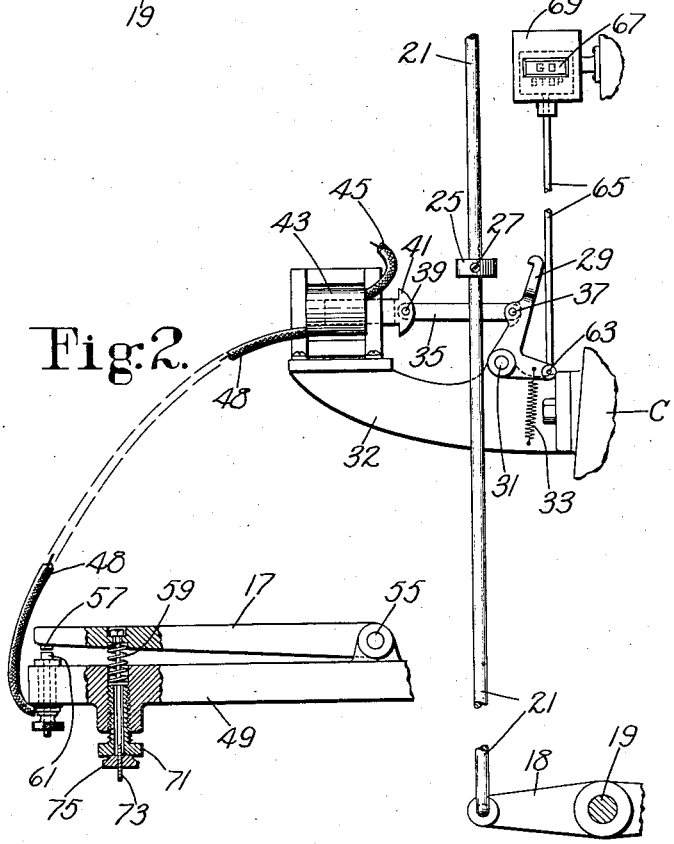
Fig. 2 is a detail, principally in elevation and upon a greatly enlarged scale, of one of the mechanisms for controlling the operation of the machines.

The control mechanisms for all three of the machines shown are substantially alike, and consequently only one of them will be described in detail. In Fig. 2, there is shown on a greatly enlarged scale the construction of the control mechanism of machine C. This machine is caused to go through one cycle of operations and then come to rest whenever a treadle 18, pivoted at 19 to the base of the machine and normally held in the position shown by a spring (not shown) is depressed and released. Depression of the treadle causes upward movement of a treadle rod 21, the lower end of which is pivoted to one end of the treadle, and the upper end of which is pivoted to the outer end of an arm 23, rocking of which controls in a known manner a suitable starting and stopping mechanism which may be of any approved type. The treadle rod 21 has an enlarged portion, herein shown as a collar 25, adjustably fastened to the rod by a screw 27, said collar being adapted to be engaged by a catch 29 whenever too many articles have accumulated on the support 17. This catch or controller is pivoted at 31 to a bracket 32 bolted to the frame of the machine and is normally held in the inoperative position shown by a tension spring 33 attached at its upper end to the tail of the catch and at its lower end to the bracket 32. A link 35 is pivoted at one end at 37 to the catch 29 and at the other end at 39 to the core 41 of a solenoid 43 which is mounted on the bracket 32. One terminal of the helix of the solenoid is connected by a conductor 45 to the line-wire 47, and the other terminal is connected by a conductor 48 to a contact member 61 carried by but insulated from a bracket 49 carried by the frame of the machine, said frame being connected by a conductor 51 with the grounded line-wire 53. The article support 17, which is pivoted to the bracket 49 at 55, carries at its outer end a contact member 57 which is normally held by a compression spring 59 out of engagement with the contact member 61. As long as the articles placed upon the support 17 do not exceed a predetermined weight, the support remains in the position shown with the contact members spaced apart; but, as soon as this weight is exceeded, the support swings down to close the circuit whereupon the solenoid is energized and the catch 29 is swung to the left to hook over the collar or enlarged portion 25 on the treadle rod 21 so that the treadle 18 can no longer be depressed, and the machine is thus prevented from being operated.

At the same time, a stop signal is displayed. Pivoted at its lower end at 63 to the tail of the catch 29 is a rod 65 the upper end of which carries a plate 67 vertically slidable in a casing 69 which is fastened to the frame of the machine. This plate has marked upon it the word Go and Stop, and the casing has in it an opening or window through which normally the word Go is visible. As soon, however, as the catch 29 is swung to the left, the word Stop is displayed.

In order to permit the normal position of the article support 17, as well as the tension of the spring 59 to be varied so that the support may be caused to respond properly to different predetermined weights of articles, the spring engages with its upper end the top of a recess formed in the under side of the support and with its lower end the upper end of a headed sleeve 71 which is threaded into a bore in the bracket 49; and a pin 73, which extends through the sleeve 71 and the spring 59, has at its upper end a head which is received in a recess in the upper side of the support and at its lower end a threaded portion engaged by a nut 75. By turning the nut 75, the normal position of the support may be changed, and by turning the sleeve 71 the tension of the spring 59 may be varied.

The control mechanism for machine A is identical with that of machine C, except that the article support 3 is pivoted at its left-hand end to its bracket instead of being pivoted at its right-hand end as in machine C. The control mechanism for machine B differs from that of machine C principally by reason of the fact that the article support 15 on which the operator of machine B places articles as fast as he has operated upon them is mounted on a bracket on machine C; and consequently the conductor 77 from one terminal of the helix of the solenoid of machine B leads to a contact member carried by a bracket of machine C upon which the article support 15 is pivoted.

With a plurality of machines arranged in series as herein shown, if, for any reason, the operator of a succeeding machine can not keep up with the operator of a preceding machine, said preceding machine is presently prevented from further operation and a signal is displayed, whereupon the foreman of the room in which the machines are installed is immediately notified of the difficulty and can at once take steps to correct it and put the system into smooth running order once more. As has been explained above, this is particularly advantageous when articles such as shoes are going through in groups or lots the styles of which vary, since it ensures that the shoes of any given lot shall not get mixed with shoes of another lot. It should also be noted that a control mechanism such as that described above may be useful as applied to a single machine where, for example, it is desired that, as soon as a given number of articles shall have been operated upon, they should be removed and placed in a container.

Although the invention has been set forth as embodied in a particular apparatus, it should be understood that the invention is not limited in the scope of its application to the particular apparatus which has been shown and described.

Having thus described my invention, what I claim as new and desire to secure by Letters Patent of the United States is:

1. The combination, with two machines for performing operations on articles successively, of a yieldable support adapted to receive the articles from the first machine preparatory to being operated upon by the second machine, and means associated with said support for stopping the operation of the first machine when articles which exceed a predetermined quantity accumulate upon the support.

2. The combination, with two machines for performing operations on articles successively, of a movable support upon which articles operated upon by the first machine are placed preparatory to being operated upon by the second machine, yielding means for maintaining said support in a selected position until articles exceeding a predetermined quantity accumulate upon it, an electric circuit, means operated by movement of the support in opposition to the yielding means for closing the circuit, a control member normally held in inoperative position to permit the first machine to operate, and means responsive to closing the circuit for moving the control member into operative position to prevent further operation of the first machine.

3. Mechanism for controlling the operation of a plurality of machines which are arranged in series and are adapted to perform successive operations upon articles being manufactured, said mechanism comprising a plurality of supports upon which articles operated upon by preceding machines are placed preparatory to being removed by the operator of succeeding machines and operated upon again, and means for preventing the operation of a preceding machine when articles operated upon by it which exceed a predetermined quantity accumulate upon its support.

4. Mechanism for controlling the operation of the preceding one of two machines which are arranged to perform successive operations upon articles being manufactured, said mechanism comprising a support accessible to the operator of the succeeding machine upon which articles operated upon by the preceding machine are placed, means for holding said support in a predetermined position in opposition to a given quantity of articles placed upon it and for permitting the support to move when the given quantity is exceeded, a member movement of which controls the operation of the preceding machine, and means responsive to the movement of the support for causing the control member to move into a position to prevent the operation of the preceding machine.

5. Mechanism for controlling the operation of the treadle-controlled preceding one of two machines which are arranged to perform successive operations upon articles being manufactured, said mechanism comprising a support accessible to the operator of the succeeding machine upon which articles operated upon by the preceding machine are placed, means for holding said support in a predetermined position in opposition to a given quantity of articles placed upon it and for permitting the support to move when the given quantity is exceeded, a control member for the treadle mechanism of the preceding machine, said member being normally held in inoperative position so that the treadle mechanism may be operated to start the preceding machine, and means responsive to movement of the article support for moving the control member into operative position to prevent operation of the treadle mechanism.

6. Mechanism for indicating the too long continued operation of the preceding one of two machines arranged to operate successively upon articles being manufactured, said mechanism comprising a support accessible to the operator of the succeeding machine upon which articles operated upon by the preceding machine are placed, means for holding the support in a predetermined position in opposition to a given quantity of articles placed upon it and for permitting the support to move when said quantity is exceeded, a signal mechanism, and means responsive to movement of the article support for operating the signal mechanism and for stopping the preceding machine.

ERASTUS E. WINKLEY.